(12) United States Patent
Whitehead et al.

(10) Patent No.: US 7,106,505 B2
(45) Date of Patent: *Sep. 12, 2006

(54) HIGH DYNAMIC RANGE DISPLAY DEVICES

(75) Inventors: Lorne Whitehead, Vancouver (CA); Greg Ward, Albany, CA (US); Wolfgang Stuerzlinger, Toronto (CA); Helge Seetzen, Montreal (CA)

(73) Assignee: The University of British Columbia, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/112,428

(22) Filed: Apr. 22, 2005

(65) Prior Publication Data

US 2005/0185272 A1    Aug. 25, 2005

Related U.S. Application Data

(62) Division of application No. 10/469,473, filed as application No. PCT/CA02/00255 on Feb. 27, 2002, now Pat. No. 6,891,672.

(60) Provisional application No. 60/271,563, filed on Feb. 27, 2001.

(51) Int. Cl.
| | |
|---|---|
| G03B 21/56 | (2006.01) |
| G03B 21/60 | (2006.01) |
| G03B 27/22 | (2006.01) |
| G03B 21/26 | (2006.01) |
| G02F 1/1335 | (2006.01) |

(52) U.S. Cl. ............ 359/443; 359/452; 359/460; 353/30; 353/31; 349/5

(58) Field of Classification Search .......... 359/443, 359/453, 454, 455, 456, 458, 460, 452; 353/30, 353/31, 99, 84, 94; 349/5, 7, 8, 112, 113; 348/383, 511, 743

See application file for complete search history.

(56) References Cited

U.S. PATENT DOCUMENTS

| | | | |
|---|---|---|---|
| 4,441,791 A | 4/1984 | Hornbeck | 350/360 |
| 4,933,754 A | 6/1990 | Reed et al. | 358/76 |
| 4,954,789 A | 9/1990 | Sampsell | 330/4.3 |
| 5,075,789 A | 12/1991 | Jones et al. | 357/40 |
| 5,247,366 A | 9/1993 | Ginosar et al. | 358/209 |
| 5,386,253 A | 1/1995 | Fielding | 345/745 |
| 5,592,193 A | 1/1997 | Chen | 345/102 |

(Continued)

FOREIGN PATENT DOCUMENTS

EP    0 829 747 A1    3/1998

(Continued)

*Primary Examiner*—Melissa Jan Koval
(74) *Attorney, Agent, or Firm*—Oyen Wiggs Green & Mutala

(57) ABSTRACT

A display has a screen which incorporates a light modulator. The screen may be a front projection screen or a rear-projection screen. Elements of the light modulator may be controlled to adjust the intensity of light emanating from corresponding areas on the screen. The display may provide a high dynamic range.

42 Claims, 6 Drawing Sheets

U.S. PATENT DOCUMENTS

| | | |
|---|---|---|
| 5,639,158 A | 6/1997 | Sato |
| 5,652,672 A | 7/1997 | Huignard et al. ............ 359/292 |
| 5,666,226 A | 9/1997 | Ezra et al. |
| 5,684,354 A | 11/1997 | Gleckman .................... 313/110 |
| 5,717,422 A | 2/1998 | Fergason ..................... 345/102 |
| 5,729,242 A | 3/1998 | Margerum et al. .............. 345/7 |
| 5,784,181 A | 7/1998 | Loiseaux et al. ............... 359/1 |
| 5,889,567 A | 3/1999 | Swanson et al. ............... 349/62 |
| 5,892,325 A | 4/1999 | Gleckman .................... 313/578 |
| 5,959,777 A | 9/1999 | Whitehead ................... 359/618 |
| 5,978,142 A | 11/1999 | Blackham et al. ........... 359/618 |
| 5,986,628 A | 11/1999 | Tuenge et al. |
| 6,043,591 A | 3/2000 | Gleckman .................... 313/110 |
| 6,120,588 A | 9/2000 | Jacobson ................. 106/31.16 |
| 6,120,839 A | 9/2000 | Comiskey et al. ........ 427/213.3 |
| 6,172,798 B1 | 1/2001 | Albert et al. ................ 359/296 |
| 6,215,920 B1 | 4/2001 | Whitehead et al. ............ 385/18 |
| 6,243,068 B1 | 6/2001 | Evanicky et al. ............ 345/102 |
| 6,276,801 B1 | 8/2001 | Fielding ........................ 353/31 |
| 6,300,932 B1 | 10/2001 | Albert ......................... 345/107 |
| 6,323,989 B1 | 11/2001 | Jacobson et al. ............ 359/296 |
| 6,327,072 B1 | 12/2001 | Comiskey et al. ........... 359/296 |
| 6,428,189 B1 | 8/2002 | Hochstein ................... 362/373 |
| 6,439,731 B1 | 8/2002 | Johnson et al. ............... 362/29 |
| 6,448,955 B1 | 9/2002 | Evanicky et al. ............ 345/102 |
| 6,483,643 B1 | 11/2002 | Zuchowski ................. 359/443 |
| 6,657,607 B1 | 12/2003 | Evanicky et al. .............. 345/88 |
| 6,680,834 B1 | 1/2004 | Williams ....................... 361/58 |
| 6,803,901 B1 | 10/2004 | Numao ....................... 345/102 |
| 6,817,717 B1 * | 11/2004 | Childers et al. ............... 353/31 |
| 6,888,663 B1 | 5/2005 | Bourdelais et al. |
| 6,891,672 B1 * | 5/2005 | Whitehead et al. ......... 359/443 |
| 2001/0035853 A1 | 11/2001 | Hoelen et al. ............... 345/102 |
| 2002/0135553 A1 | 9/2002 | Nagai et al. .................. 345/89 |
| 2002/0159002 A1 | 10/2002 | Chang .......................... 349/61 |
| 2003/0048393 A1 | 3/2003 | Sayag ............................ 349/5 |
| 2003/0090455 A1 | 5/2003 | Daly .......................... 345/102 |
| 2004/0057017 A1 | 3/2004 | Childers et al. ............... 353/31 |

FOREIGN PATENT DOCUMENTS

| | | |
|---|---|---|
| EP | 1 202 244 A1 | 5/2002 |
| EP | 1431653 A2 | 6/2004 |
| EP | 1521235 A2 | 4/2005 |
| JP | 08-334742 | 12/1996 |
| JP | 11052412 | 2/1999 |
| JP | 2000275995 | 10/2000 |
| JP | 2002091385 | 3/2002 |
| WO | 91/15843 | 10/1991 |
| WO | WO91/15843 * | 10/1991 |
| WO | 96/33483 | 10/1996 |
| WO | 00/75720 A2 | 12/2000 |
| WO | 01/69584 A1 | 9/2001 |
| WO | 02/03687 A2 | 1/2002 |
| WO | 02/069030 | 9/2002 |
| WO | 02/079862 | 10/2002 |
| WO | 03/077013 | 9/2003 |

* cited by examiner

HIGH DYNAMIC RANGE DISPLAY DEVICES

CROSS REFERENCE TO RELATED APPLICATIONS

This application is a divisional of U.S. patent application Ser. No. 10/469,473 (accorded filing date 27 Aug. 2003), now U.S. Pat. No. 6,891,672, which is the U.S. National Stage of International Application No. PCT/CA02/00255 filed on 27 Feb. 2002, which claims the benefit of U.S. Provisional Patent Application No. 60/271,563 filed on 27 Feb., 2001 and entitled HIGH DYNAMIC RANGE COLOUR DISPLAY AND PROJECTION TECHNOLOGY. These prior applications are incorporated herein by this reference.

TECHNICAL FIELD

The invention relates to displays for displaying digital images.

BACKGROUND

Dynamic range is the ratio of intensity of the highest luminance parts of a scene and the lowest luminance parts of a scene. For example, the image projected by a video projection system may have a maximum dynamic range of 300:1.

The human visual system is capable of recognizing features in scenes which have very high dynamic ranges. For example, a person can look into the shadows of an unlit garage on a brightly sunlit day and see details of objects in the shadows even though the luminance in adjacent sunlit areas may be thousands of times greater than the luminance in the shadow parts of the scene. To create a realistic rendering of such a scene can require a display having a dynamic range in excess of 1000:1. The term "high dynamic range" means dynamic ranges of 800:1 or more.

Modern digital imaging systems are capable of capturing and recording digital representations of scenes in which the dynamic range of the scene is preserved. Computer imaging systems are capable of synthesizing images having high dynamic ranges. However, current display technology is not capable of rendering images in a manner which faithfully reproduces high dynamic ranges.

Blackham et al., U.S. Pat. No. 5,978,142 discloses a system for projecting an image onto a screen. The system has first and second light modulators which both modulate light from a light source. Each of the light modulators modulates light from the source at the pixel level. Light modulated by both of the light modulators is projected onto the screen.

Gibbon et al., PCT Application No. PCT/US01/21367 discloses a projection system which includes a pre modulator. The pre modulator controls the amount of light incident on a deformable mirror display device. A separate pre-modulator may be used to darken a selected area (e.g. a quadrant).

There exists a need for cost effective displays capable of reproducing a wide range of light intensities in displayed images.

SUMMARY

This invention provides displays for displaying images and methods for displaying images. One aspect of the invention provides a display comprising: a light source; a first spatial light modulator located to modulate light from the light source; a display screen comprising a second spatial light modulator; and, an optical system configured to image light modulated by the first spatial light modulator onto a first face of the display screen.

Another aspect of the invention provides a display comprising: a light source; a first spatial light modulator located to modulate light from the light source, the first spatial light modulator comprising an array of controllable pixels; and, a second spatial light modulator located to modulate light modulated by the first spatial light modulator the second spatial light modulator comprising an array of controllable pixels; wherein each pixel of one of the first and second spatial light modulators corresponds to a plurality of pixels of the other one of the first and second light modulators.

Another aspect of the invention provides a display device comprising: first spatial modulation means for providing light spatially modulated at a first spatial resolution; second spatial modulation means for further spatially modulating the light at a second resolution different from the first resolution; and, means for controlling the first and second spatial modulation means to display an image defined by image data.

A still further aspect of the invention provides a method for displaying an image having a high dynamic range. The method comprises: generating light, spatially modulating the light according to image data in a first light modulating step; and, imaging the spatially modulated light onto a screen comprising a light modulator.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention provides displays capable of rendering images with high dynamic ranges. Displays according to the invention comprise two light modulating stages. Light passes through the stages in series to provide an image which has an increased dynamic range.

Figure 1:
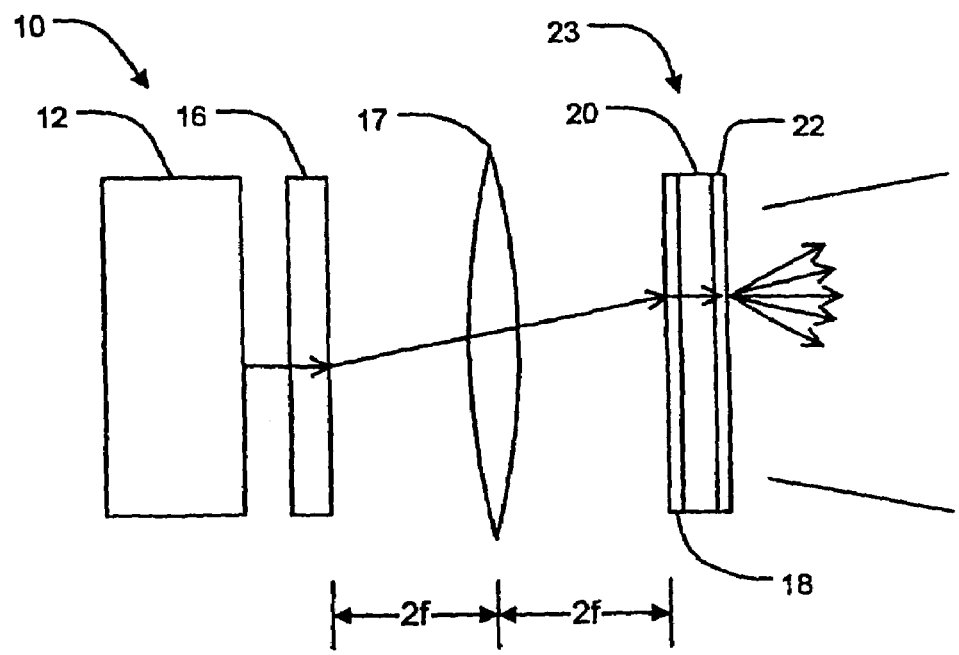
FIG. 1 is a schematic illustration of a display according to one embodiment of the invention.

FIG. 1 illustrates schematically a display 10 according to a simple embodiment of the invention. The sizes of elements and distances between them in FIG. 1 are not to scale. Display 10 comprises a light source 12. Light source 12 may, for example, comprise a projection lamp such as an incandescent lamp or an arc lamp, a laser, or another suitable source of light. Light source 12 may comprise an optical system comprising one or more mirrors, lenses or other optical elements which cooperate to deliver light to the rest of display 10.

In the illustrated embodiment, light from light source 12 is directed toward a first light modulator 16. Light source 12 preferably provides substantially uniform illumination of first light modulator 16. Light modulator 16 comprises an array of individually addressable elements. Light modulator 16 may comprise, for example, a LCD (liquid crystal display), which is an example of a transmission-type light modulator or a DMD (deformable mirror device), which is an example of a reflection-type light modulator. Display driver circuitry (not shown in FIG. 1) controls the elements of light modulator 16 according to data which defines an image being displayed.

Light which has been modulated by first light modulator 16 is imaged onto a rear-projection screen 23 by a suitable optical system 17. Light from a small area of first light modulator 16 is directed by optical system 17 to a corresponding area on rear-projection screen 23. In the illustrated embodiment, optical system 17 comprises a lens having a focal length f. In general, the optical system 17 which images light modulated by first light modulator 16 onto rear-projection screen 23 may comprise one or more mirrors, lenses or other optical elements. Such an optical system has the function of imaging light modulated by the first light modulator onto a second light modulator.

In the illustrated embodiment, rear-projection screen 23 comprises a second light modulator 20 and a collimator 18. A main function of collimator 18 is to cause light which passes through rear-projection screen 23 to be directed preferentially toward a viewing area. Collimator 18 may comprise a Fresnel lens, a holographic lens, or, in the alternative, another arrangement of one or more lenses and/or other optical elements which will guide light in the direction of a viewing area.

In the illustrated embodiment, collimator 18 causes light to travel through the elements of second light modulator 20 in a direction which is generally normal to screen 23. As light incident from collimator 18 travels through second light modulator 20 it is further modulated. The light then passes to a diffuser 22 which scatters the outgoing light through a range of directions so that a viewer located on an opposite side of diffuser 22 from first light modulator 16 can see light originating from the whole area of screen 23. In general, diffuser 22 may scatter light to a different angular extent in the horizontal and vertical planes. Diffuser 22 should be selected so that light modulated by second light modulator 20 is scattered through a range of angles such that the maximum scatter angle is at least equal to the angle subtended by screen 23 when viewed from a desired viewing location.

Rear-projection screen 23 may differ in area from first light modulator 16. For example, rear-projection screen 23 may be larger in area than first light modulator 16. Where this is the case, optical system 17 expands the beam of light modulated by first light modulator 16 to illuminate a larger corresponding area on rear-projection screen 23.

Second light modulator 20 may be of the same type as first light modulator 16 or a different type. Where first and second light modulators 16 and 20 are both of types that polarize light, second light modulator 20 should, as much as is practical, be oriented so that its plane of polarization matches that of the light incident on it from first light modulator 16.

Display 10 may be a color display. This may be achieved in various ways including:
  making one of first light modulator 16 and second light modulator 20 a color light modulator;
  providing a plurality of different first light modulators 16 operating in parallel on different colors; and,
  providing a mechanism for rapidly introducing different color filters into the light path ahead of second light modulator 20.

As an example of the first approach above, second light modulator 20 may comprise an LCD panel having a plurality of pixels each comprising a number of colored sub-pixels. For example, each pixel may comprise three sub-pixels, one associated with a red filter, one associated with a green filter and one associated with a blue filter. The filters may be integral with the LCD panel.

Figure 1A:
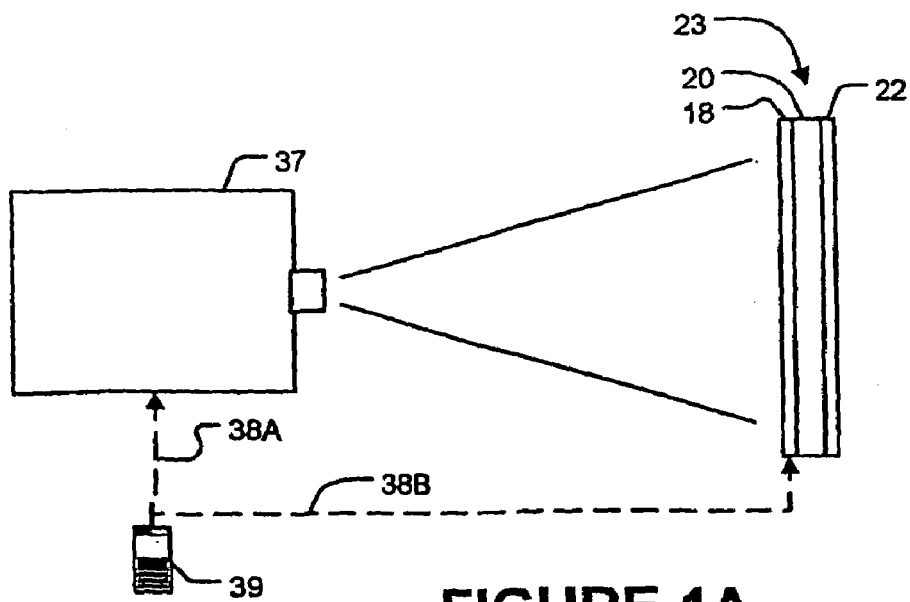
FIG. 1A is a schematic illustration of a specific implementation of the display of FIG. 1.

As shown in FIG. 1A, light source 12, first light modulator 16 and optical system 17 may all be parts of a digital video projector 37 located to project an image defined by a signal 38A from a controller 39 onto the back side of rear-projection screen 23. The elements of second light modulator 20 are controlled by a signal 38B from controller 39 to provide an image to a viewer which has a high dynamic range.

Figure 2:
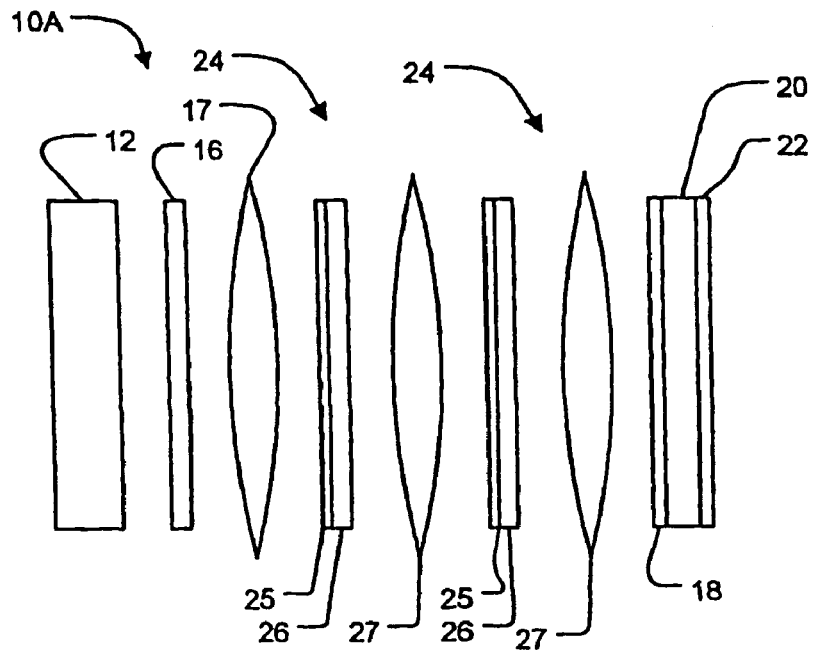
FIG. 2 is a schematic illustration of a display according to an alternative embodiment of the invention comprising four spatial light modulators.

As shown in FIG. 2, a display 10A according to the invention may comprise one or more additional light modulation stages 24. Each additional light modulation stage 24 comprises a collimator 25, a light modulator 26 and an optical system 27 which focuses light from light modulator 26 onto either the next additional light modulation stage 24 or on collimator 18. In device 10A of FIG. 2 there are two additional light modulation stages 24. Devices according to this embodiment of the invention may have one or more additional light modulation stages 24.

The luminance of any point on output diffuser 22 can be adjusted by controlling the amount of light passed on by corresponding elements of light modulators 16, 20 and 26. This control may be provided by a suitable control system (not shown in FIG. 2) connected to drive each of light modulators 16, 20 and 26.

Figure 3:
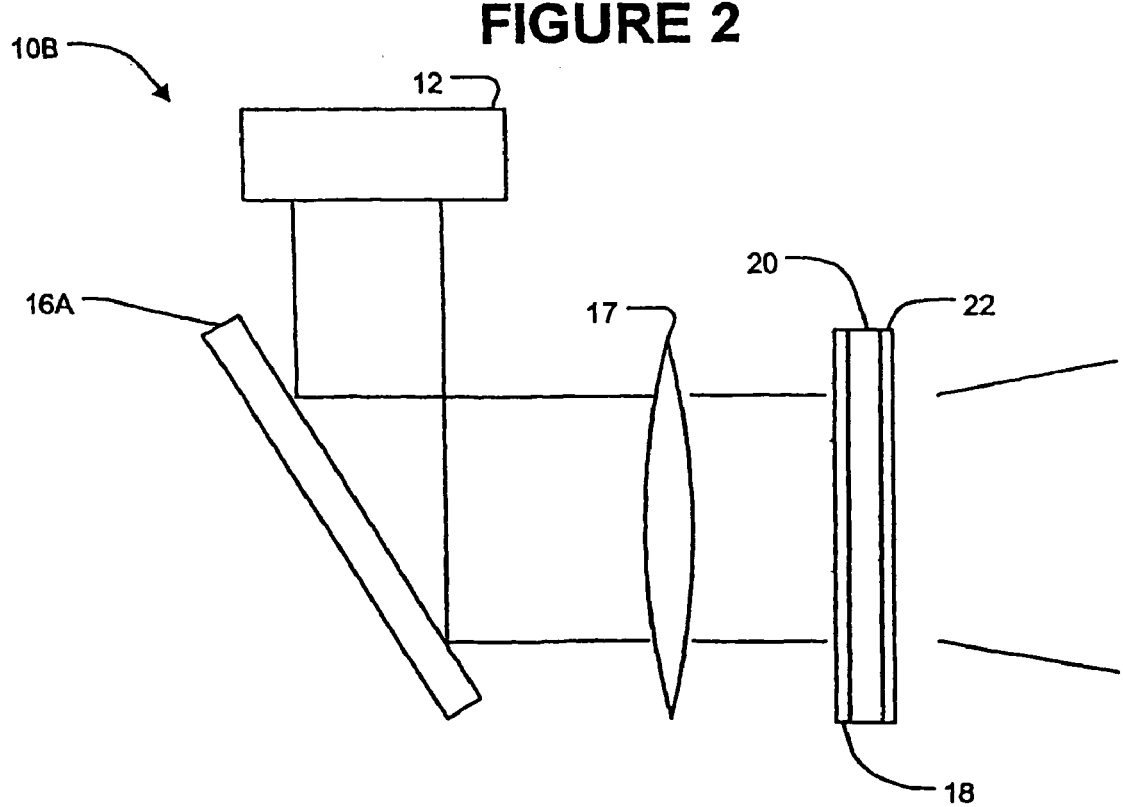
FIG. 3 is a schematic illustration of a rear-projection-type display according to a further embodiment of the invention.

As noted above, light modulators 16, 20 and 26 may all be of the same type or may be of two or more different types. FIG. 3 illustrates a display 10B according to an alternative embodiment of the invention which includes a first light modulator 16A which comprises a deformable mirror device. A deformable mirror device is a "binary" device in the sense that each pixel may be either "on" or "off". Different apparent brightness levels may be produced by turning a pixel on and off rapidly. Such devices are described, for example, in U.S. Pat. Nos. 4,441,791 and, 4,954,789 and are commonly used in digital video projectors. Light source 12 and first light modulator 16 (or 16A) may be the light source and modulator from a commercial digital video projector, for example.

Figure 4:
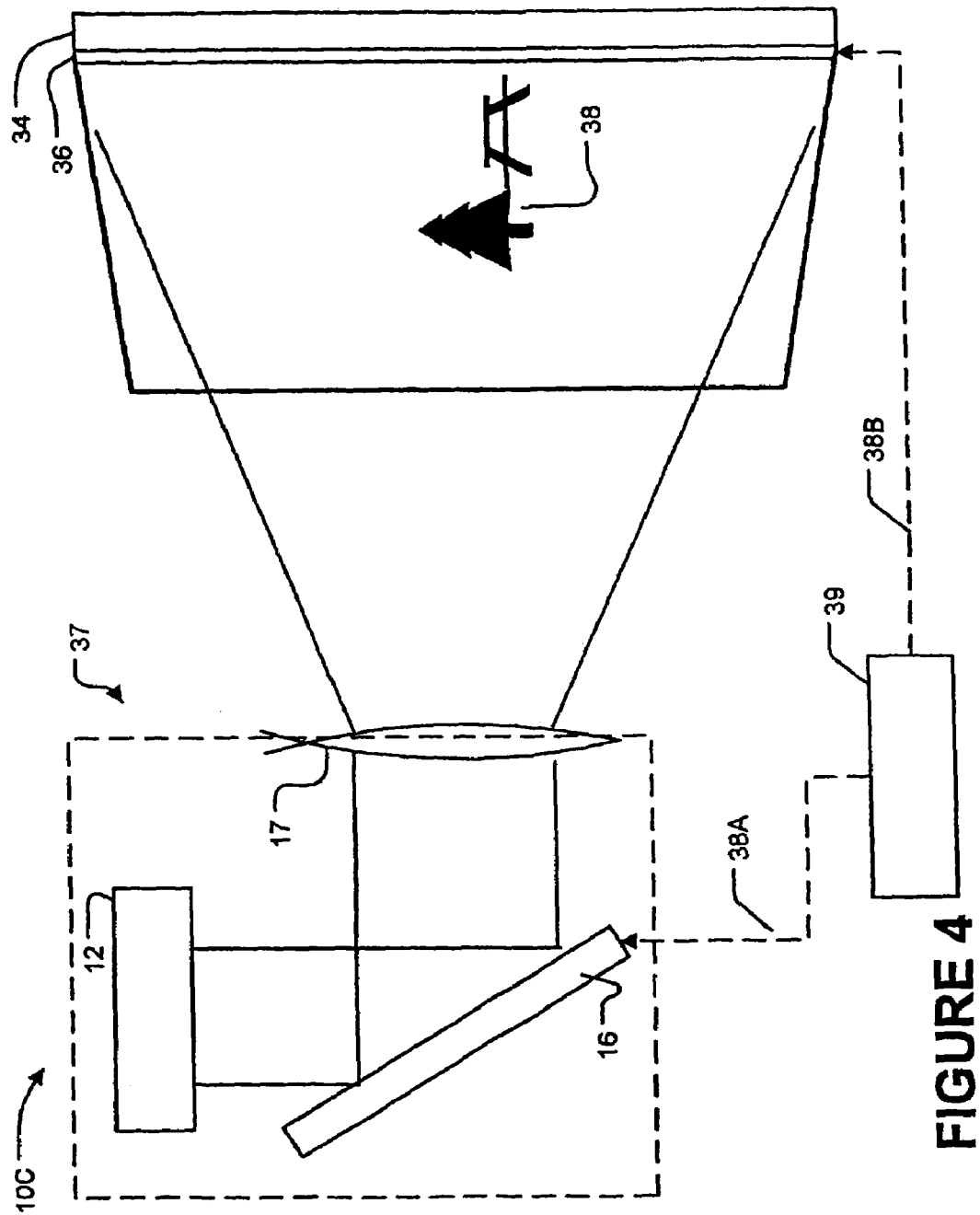
FIG. 4 is a schematic illustration of a front-projection-type display according to a still further embodiment of the invention.

FIG. 4 illustrates a front-projection-type display 10C according to the invention. Display 10C comprises a screen 34. A projector 37 projects an image 38 onto screen 34. Projector 37 comprises a suitable light source 12, a first light modulator 16 and an optical system 17 suitable for projecting an image defined by first light modulator 16 onto screen 34. Projector 37 may comprise a commercially available display projector. Screen 34 incorporates a second light modulator 36. Second light modulator 36 comprises a number of addressable elements which can be individually controlled to affect the luminance of a corresponding area of screen 34.

Light modulator 36 may have any of various constructions. For example, light modulator 36 may comprise an array of LCD elements each having a controllable transmissivity located in front of a reflective backing. Light projected by projector 37 passes through each LCD element and is reflected back through the LCD element by the reflective backing. The luminance at any point on screen 34 is determined by the intensity of light received at that point by projector 37 and the degree to which light modulator 36 (e.g. the LCD element at that point) absorbs light being transmitted through it.

Light modulator 36 could also comprise an array of elements having variable retro-reflection properties. The elements may be prismatic. Such elements are described, for example, in Whitehead, U.S. Pat. No. 5,959,777 entitled Passive High Efficiency Variable Reflectivity Image Display Device and, Whitehead et al., U.S. Pat. No. 6,215,920 entitled Electrophoretic, High Index and Phase Transition Control of Total Internal Reflection in High Efficiency Variable Reflectivity Image Displays.

Light modulator 36 could also comprise an array of electrophoretic display elements as described, for example, in Albert et al., U.S. Pat. No. 6,172,798 entitled Shutter Mode Microencapsulated Electrophoretic Display; Comiskey et al., U.S. Pat. No. 6,120,839 entitled Electro-osmotic Displays and Materials for Making the Same; Jacobson, U.S. Pat. No. 6,120,588 entitled: Electronically Addressable Microencapsulated Ink and Display; Jacobson et al., U.S. Pat. No. 6,323,989 entitled Electrophoretic Displays Using Nanoparticles; Albert, U.S. Pat. No. 6,300,932 entitled Electrophoretic Displays with Luminescent Particles and Materials for Making the Same or, Comiskey et al., U.S. Pat. No. 6,327,072 entitled Microcell Electrophoretic Displays.

Figure 6:
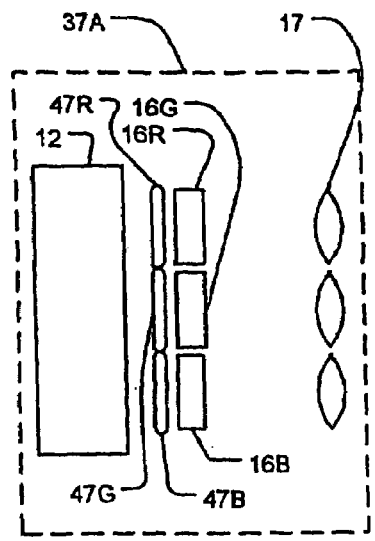
FIG. 6 is a schematic illustration of a front-projection-type color display having an alternative projector construction.
Figure 6A:
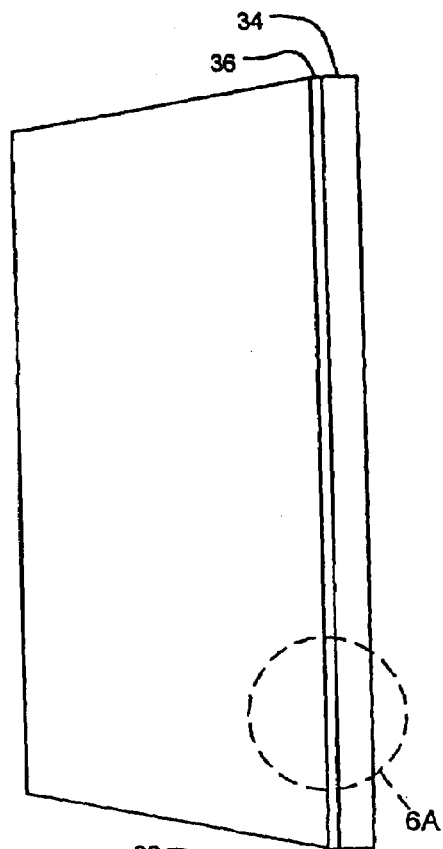
FIGS. 6A and 6B are expanded cross-sectional views of portions of the front-projection screen of the color display of FIG. 6.
Figure 6A:
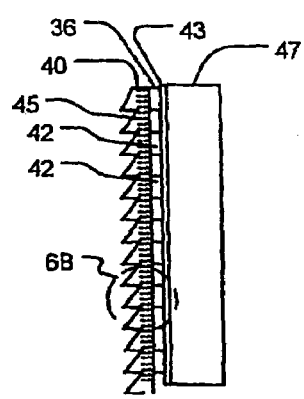
Figure 6B:
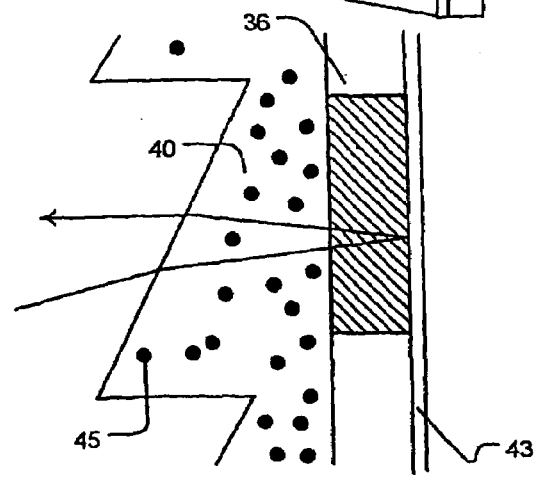

As shown in FIGS. 6A and 6B, screen 34 preferably comprises a lens element 40 which functions to direct light preferentially toward the eyes of viewers. In the illustrated embodiment, lens element 40 comprises a Fresnel lens having a focal point substantially coincident with the apex of the cone of light originating from projector 37. Lens element 40 could comprise another kind of lens such as a holographic lens. Lens element 40 incorporates scattering centers 45 which provide a desired degree of diffusion in the light reflected from screen 34. In the illustrated embodiment, second light modulator 36 comprises a reflective LCD panel having a large number of pixels 42 backed by a reflective layer 43 and mounted on a backing 47.

Where light modulator 36 comprises an array of elements having variable retro-reflection properties, the elements themselves could be designed to direct retro-reflected light preferentially in a direction of a viewing area in front of screen 34. Reflective layer 43 may be patterned to scatter light to either augment the effect of scattering centers 45 or replace scattering centers 45.

As shown in FIG. 4, a controller 39 provides data defining image 38 to each of first light modulator 16 and second light modulator 36. Controller 39 could comprise, for example, a computer equipped with a suitable display adapter. Controller 39 may comprise image processing hardware to accelerate image processing steps. The luminance of any point on screen 34 is determined by the combined effect of the pixels in first light modulator 16 and second light modulator 36 which correspond to that point. There is minimum luminance at points for which corresponding pixels of the first and second light modulators are set to their "darkest" states. There is maximum luminance at points for which corresponding pixels of the first and second light modulators are set to their "brightest" states. Other points have intermediate luminance values. The maximum luminance value might be, for example, on the order of $10^5$ cd/m$^2$. The minimum luminance value might be, for example on the order of $10^{-2}$ cd/m$^2$.

The cost of a light modulator and its associated control circuitry tends to increase with the number of addressable elements in the light modulator. In some embodiments of the invention one of the light modulators has a spatial resolution significantly higher than that of one or more other ones of the light modulators. When one or more of the light modulators are lower-resolution devices the cost of a display according to such embodiments of the invention may be reduced. In color displays comprising two or more light modulators, one of which is a color light modulator (a combination of a plurality of monochrome light modulators may constitute a color light modulator as shown, for example, in FIG. 6) and one of which is a higher-resolution light modulator, the higher-resolution light modulator should also be the color light modulator. In some embodiments the higher-resolution light modulator is imaged onto the lower-resolution light modulator. In other embodiments the lower-resolution light modulator is imaged onto the higher-resolution light modulator.

Figure 5:
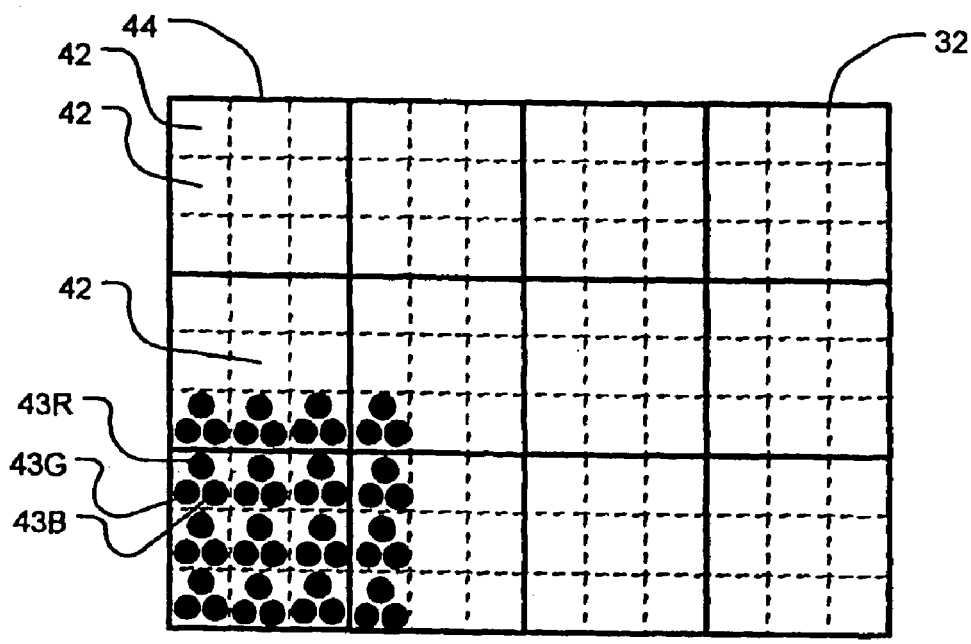
FIG. 5 is a drawing illustrating a possible relationship between pixels in a higher-resolution spatial light modulator and pixels in a lower-resolution spatial light modulator in a display according to the invention.

FIG. 5 illustrates one possible configuration of pixels in a display 10 as shown in FIG. 1. Nine pixels 42 of a second light modulator 20 correspond to each pixel 44 of a first light modulator 16. The number of pixels 42 of second light modulator 20 which correspond to each pixel 44 of first light modulator 16 may be varied as a matter of design choice. Pixels 44 of the higher-resolution one of first and second light modulators 16 and 20 (or 36) should be small enough to provide a desired overall resolution. In general there is a trade off between increasing resolution and increasing cost. In a typical display the higher-resolution light modulator will provide an array of pixels having at least a few hundred pixels in each direction and more typically over 1000 pixels in each direction.

Figure 5A:
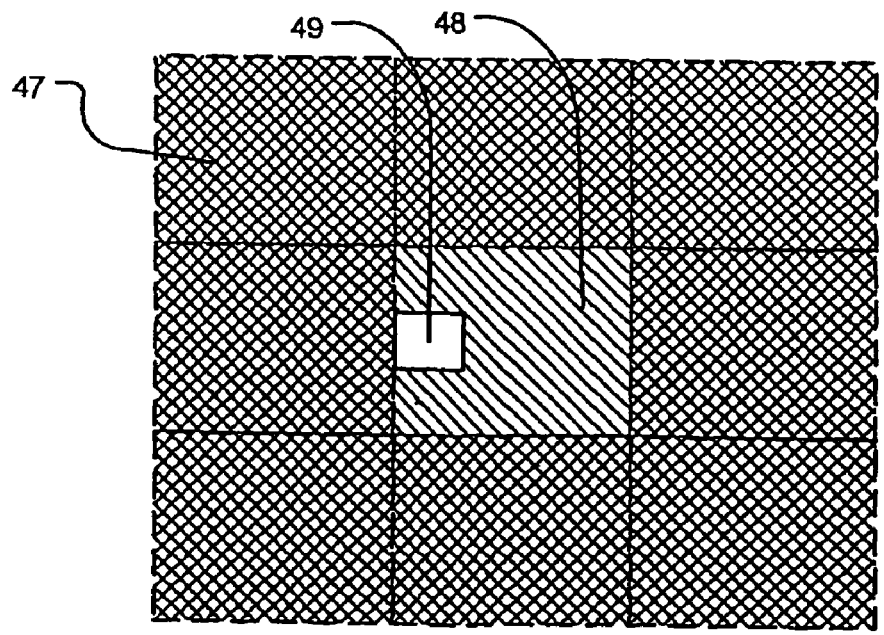
FIG. 5A illustrates an effect of providing one light modulator which has lower resolution than another light modulator.

The size of pixels 44 of the lower-resolution one of the first and second light modulators determines the scale over which one can reliably go from maximum intensity to minimum intensity. Consider, for example, FIG. 5A which depicts a situation where one wishes to display an image of a small maximum-luminance spot on a large minimum-luminance background. To obtain maximum luminance in a spot 49, those pixels of each of the first and second light modulators which correspond to spot 49 should be set to their maximum-luminance values. Where the pixels of one light modulator are lower in resolution than pixels of the other light modulator then some pixels of the lower-resolution light modulator will straddle the boundary of spot 49. This is the case, for example, in FIG. 5A.

Outside of spot 49 there are two regions. In region 48 it is not possible to set the luminance to its minimum value because in that region the lower-resolution light modulator is set to its highest luminance value. In region 47 both of the light modulators can be set to their lowest-luminance values. If, for example, each of the first and second light modulators has a luminance range of 1 to 100 units, then spot 49 might have a luminance of 100×100=10,000 units, region 48 would have a luminance of 100×1=100 units and region 47 would have a luminance of 1×1=1 units.

As a result of having one of the light modulators lower in resolution than the other, each pixel of the lower-resolution light modulator corresponds to more than one pixel in the higher-resolution light modulator. It is not possible for points corresponding to any one pixel of the lower-resolution light modulator and different pixels of the higher-resolution light modulator to have luminance values at extremes of the device's dynamic range. The maximum difference in luminance between such points is determined by the dynamic range provided by the higher-resolution light modulator.

It is generally not a problem that a display is not capable of causing closely-spaced points to differ in luminance from one another by the full dynamic range of the display. The human eye has enough intrinsic scatter that it is incapable of appreciating large changes in luminance which occur over very short distances in any event.

In a display according to the invention which includes both a lower-resolution spatial light modulator and a higher-resolution spatial light modulator, controller 39 may determine a value for each pixel of the lower-resolution spatial light modulator and adjust the signals which control the higher-resolution spatial light modulator to reduce artefacts which result from the fact that each pixel of the lower-resolution spatial light modulator is common to a plurality of pixels of the higher-resolution spatial light modulator. This may be done in any of a wide number of ways.

For example, consider the case where each pixel of the lower-resolution spatial light modulator corresponds to a plurality of pixels of the higher-resolution spatial light modulator. Image data specifying a desired image is supplied to the controller. The image data indicates a desired luminance for an image area corresponding to each of the pixels of the higher-resolution spatial light modulator. The controller may set the pixels of the lower-resolution light modulator to provide an approximation of the desired image. This could be accomplished, for example, by determining an average or weighted average of the desired luminance values for the image areas corresponding to each pixel of the lower-resolution light modulator.

The controller may then set the pixels of the higher-resolution light modulator to cause the resulting image to approach the desired image. This could be done, for example, by dividing the desired luminance values by the known intensity of light incident from the lower-resolution light modulator on the corresponding pixels of the higher-resolution light modulator. Processing to generate the signals for driving the light modulators may be performed on the fly by controller 39, may be performed earlier by controller 39 or some other device and integrated into the image data or some processing may be performed earlier and controller 39 may perform final processing to generate the control signals.

If the low-resolution pixels are too large then a viewer may be able to discern a halo around bright elements in an image. The low resolution pixels are preferably small enough that the appearance of bright patches on dark backgrounds or of dark spots on bright backgrounds is not unacceptably degraded. It is currently considered practical to provide in the range of about 8 to about 144, more preferably about 9 to 36, pixels on the higher-resolution light modulator for each pixel of the lower-resolution light modulator.

The sizes of steps in which each of pixels 42 and 44 can adjust the luminance of point(s) on the image are not necessarily equal. The pixels of the lower-resolution light modulator may adjust light intensity in coarser steps than the pixels of the higher-resolution light modulator. For example, the lower-resolution light modulator may permit adjustment of light intensity for each pixel over an intensity range of 1 to 512 units in 8 steps while the higher-resolution light modulator may permit adjustment of the light intensity for each pixel over a similar range in 512 steps. While pixels 42 and 44 are both illustrated as being square in FIG. 5, this is not necessary. Pixels 42 and/or 44 could be other shapes, such as rectangular, triangular, hexagonal, round, or oval.

Figure 7:
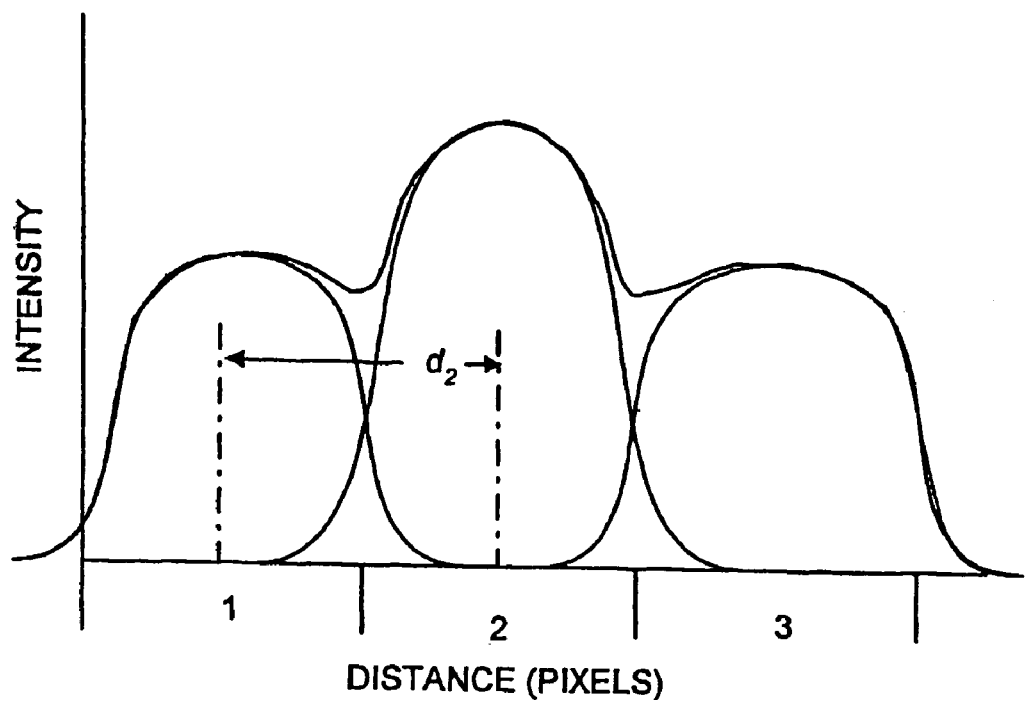
FIG. 7 is a graph illustrating how light imaged onto a higher-resolution light modulator from pixels of a lower-resolution light modulator can overlap to yield a smooth variation in light intensity with position; and, FIG. 7A is a graph illustrating how the variation in light intensity with position for the image of a pixel of a light modulator can be represented as the convolution of a square profile and a spread function.
Figure 7A:
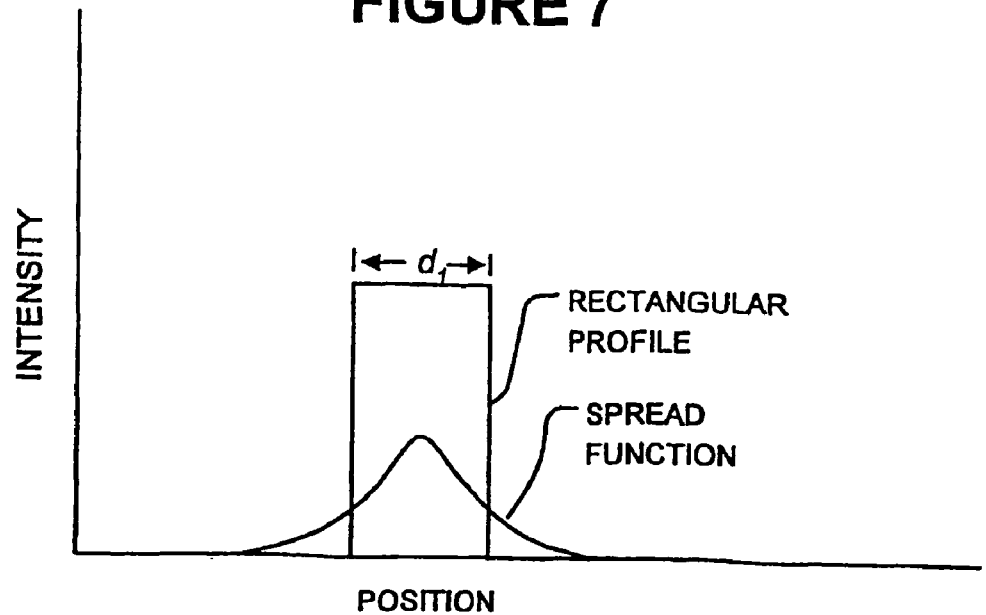

The pixels of the lower-resolution light modulator preferably emit light which is somewhat diffuse so that the light intensity varies reasonably smoothly as one traverses pixels of the lower-resolution light modulator. This is the case where the light from each of the pixels of the lower-resolution light modulator spreads into adjacent pixels, as shown in FIG. 7. As shown in FIG. 7A, the intensity profile of a pixel in the lower-resolution light modulator can often be approximated by gaussian spread function convolved with a rectangular profile having a width $d_1$ equal to the active width of the pixel. The spread function preferably has a full width at half maximum in the range of $0.3 \times d_2$ to $3 \times d_2$, where $d_2$ is the center-to-center inter-pixel spacing, to yield the desired smoothly varying light intensity. Typically $d_1$ is nearly equal to $d_2$.

In the embodiment of FIG. 5, each pixel 42 comprises three sub pixels 43R, 43G and 43B (for clarity FIG. 5 omits sub pixels for some pixels 42). Sub-pixels 43R, 43G and 43B are independently addressable. They are respectively associated with red, green and blue color filters which are integrated into second light modulator 20. Various constructions of LCD panels which include a number of colored sub-pixels and are suitable for use in this invention are known in the art.

For front projection-type displays (for example the display 10C of FIG. 4), it is typically most practical for first light modulator 16 to comprise a high-resolution light modulator which provides color information and for light modulator 36 to comprise a monochrome light modulator. Light modulator 36 preferably has reasonably small addressable elements so that the boundaries of its elements do not form a visually distracting pattern. For example, light modulator 36 may have the same number of addressable elements as projector 37 (although each such element will typically have significantly larger dimensions than the corresponding element in light modulator 16 of projector 37).

Projector 37 may have any suitable construction. All that is required is that projector 37 be able to project light which has been spatially modulated to provide an image onto screen 34. FIG. 6 illustrates a display system 10D according to a further alternative embodiment of the invention. System 10D comprises a screen 34 which has an integrated light modulator 36 as described above with reference to FIG. 4. System 10D comprises a projector 37A which has separate light modulators 16R, 16G and 16R for each of three colors. Light modulated by each of light modulators 16R, 16G and 16R is filtered by a corresponding one of three colored filters 47R, 47G and 47B. The modulated light is projected onto screen 34 by optical systems 17. A single light source 12 may supply light to all three light modulators 16R, 16G, and 16B, or separate light sources (not shown) may be provided.

As will be apparent to those skilled in the art in the light of the foregoing disclosure, many alterations and modifications are possible in the practice of this invention without departing from the spirit or scope thereof. For example:

- diffuser 22 and collimator 18 could be combined with one another;
- diffuser 22 and collimator 18 could be reversed in order;
- multiple cooperating elements could be provided to perform light diffusion and/or collimation;
- the order in screen 23 of second light modulator 20 collimator 18 and diffuser 22 could be varied;
- the signal 38A driving first light modulator 16 may comprise the same data driving second light modulator 20 or may comprise different data.

Accordingly, the scope of the invention is to be construed in accordance with the substance defined by the following claims.

What is claimed is:

1. A front projection display comprising:
   a light source;
   first spatial light modulator located to modulate light from the light source;
   a display screen comprising a second spatial light modulator; and,
   an optical system configured to image light modulated by the first spatial light modulator onto a first face of the display screen;
   wherein the display screen is configured to reflect light to a viewer, each of the first and second spatial light modulators comprises a two-dimensional array of controllable elements capable of modulating light, the first light modulator has a first resolution and the second spatial light modulator has a second resolution different from the first resolution.

2. A display according to claim 1, wherein an area of the display screen corresponding to each controllable element of the one of the first and second spatial light modulators is sufficiently small that intrinsic scattering in a human eye prevents a viewer from perceiving differences in luminances between points within the area where a ratio of luminances of such points is greater than a dynamic range of the other one of the first and second spatial light modulators.

3. A display according to claim 1, wherein more than one of the controllable elements of the first spatial light modulator correspond to each controllable element of the second spatial light modulator.

4. A display according to claim 3, wherein, there are more than eight controllable elements of the first spatial light modulator corresponding to each controllable element of the second spatial light modulator.

5. A display according to claim 3, wherein the first spatial light modulator comprises a color spatial light modulator.

6. A display according to claim 1, wherein the second spatial light modulator comprises a monochrome spatial light modulator.

7. A display according to claim 1, wherein, each of the first and second spatial light modulators comprises a plurality of controllable elements and for each controllable element of one of the first and second spatial light modulators, the other one of the first and second spatial light modulators has in the range of eight to one hundred forty four corresponding controllable elements.

8. A display according to claim 1, wherein the first spatial light modulator is higher in resolution than the second spatial light modulator.

9. A display according to claim 8, wherein the light source and first spatial light modulator comprise the light source and first spatial light modulator of a digital projector and the digital projector comprises imaging optics which image the first spatial light modulator onto the second spatial light modulator.

10. A display according to claim 1, comprising a controller connected to deliver image data to both the first and second spatial light modulators.

11. A display according to claim 1, wherein the display screen comprises a diffuser.

12. A display according to claim 11, wherein the display screen comprises a collimator located to collimate light incident from the first spatial light modulator.

13. A display according to claim 1, wherein the display screen comprises a collimator located to collimate light incident from the first spatial light modulator.

14. A display according to claim 13, wherein the collimator comprises a Fresnel lens.

15. A display according to claim 14, wherein the Fresnel lens comprises a large number of scattering centers distributed therein for diffusing light incident thereon.

16. A display according to claim 13, wherein the collimator comprises a holographic lens.

17. A display according to claim 16, wherein the holographic lens comprises a large number of scattering centers distributed therein for diffusing light incident thereon.

18. A display according to claim 1, comprising one or more additional light modulation stages between the first spatial light modulator and the second spatial light modulator, the one or more additional light modulation stages each comprise a collimator and a spatial light modulator onto which light modulated by a previous spatial light modulator is imaged.

19. A display according to claim 1, wherein the screen is larger in area than the first light modulator.

20. A display according to claim 1, wherein the second spatial light modulator comprises a transmission-type spatial light modulator.

21. A display according to claim 1, wherein the second spatial light modulator comprises an array of liquid crystal display elements each having a transmissivity controllable by a control signal.

22. A display according to claim 1, wherein the second spatial light modulator comprises an array of retro-reflective display elements.

23. A display according to claim 1, wherein the second spatial light modulator comprises an array of electrophoretic display elements.

24. A display according to claim 1, wherein the second light modulator comprises an array of variable-transmissivity elements located in front of a reflector.

25. A display according to claim 24, wherein the reflector has a roughened surface and the reflector both scatters and reflects light incident on it through the variable-transmissivity element.

26. A display according to claim 24, wherein the variable-transmissivity element comprises a liquid crystal display element.

27. A display according to claim 1, wherein, each of the first and second spatial light modulators comprises a plurality of controllable elements and for each controllable element of the first spatial light modulator, the second spatial light modulator has more than one corresponding controllable elements.

28. A display according to claim 27, wherein, at the second spatial light modulator, a distribution of the light modulated by each of a plurality of controllable elements of the first spatial light modulator comprises a convolution of a rectangular distribution and a spread function wherein the spread function has a full width at half maximum in the range of $0.3 \times d_2$ to $3 \times d_2$, where $d_2$ is a center-to-center spacing on the second spatial light modulator of distributions of light modulated by adjacent controllable elements of the first spatial light modulator.

29. A display according to claim 27, wherein each of a plurality of controllable elements of the first spatial light modulator produces a distribution of light on the second spatial light modulator and the distributions of light on the second spatial light modulator arising from adjacent controllable elements of the first spatial light modulator overlap with one another.

30. A display according to claim 1, comprising a controller connected to drive each of the first and second spatial light modulators, the controller configured to provide a first control signal to control the controllable elements of the first spatial light modulator to provide an approximation of a desired image and to provide a second control signal to control the controllable elements of the second spatial light modulator to correct the approximate image.

31. A display according to claim 1, wherein each of the first and second spatial light modulators comprises a plurality of controllable elements, the controllable elements of the first spatial light modulator have a number N of discrete selectable brightness levels, the controllable elements of the second spatial light modulator have a number M of discrete selectable brightness levels and N>M.

32. A display according to claim 1, wherein each of the first and second spatial light modulators comprises a plurality of controllable elements, the controllable elements of the first spatial light modulator have a number N of discrete selectable brightness levels, the controllable elements of the second spatial light modulator have a number M of discrete selectable brightness levels and N<M.

33. A front-projection display comprising:
first spatial modulation means for providing light spatially modulated at a first spatial resolution;
a display screen comprising a second spatial modulation means for further spatially modulating the light at a second resolution different from the first resolution; and,
means for controlling the first and second spatial modulation means to display an image defined by image data;
wherein the display comprises a front projection-type display and the display screen is configured to reflect light to a viewer.

34. A display according to claim 33, wherein, each of the first and second spatial modulation means comprises a plurality of controllable elements and for each controllable element of one of the first and second spatial modulation means, the other one of the first and second spatial modulation means has more than one corresponding controllable elements.

35. A display according to claim 33, wherein an area of the display screen corresponding to each controllable element of the one of the first and second spatial modulation means is sufficiently small that intrinsic scattering in a human eye prevents a viewer from perceiving differences in luminances between points within the area where a ratio of luminances of such points is greater than a dynamic range of the other one of the first and second spatial modulation means.

36. A display according to claim 33, wherein the display screen comprises a diffuser.

37. A display according to claim 33, wherein the display screen comprises a collimator located to collimate light incident from the first spatial modulation means.

38. A display according to claim 37, wherein the collimator comprises a large number of scattering centers distributed therein for diffusing light incident thereon.

39. A display according to claim 33, wherein the second spatial modulation means comprises an array of liquid crystal display elements each having a transmissivity controllable by a control signal.

40. A display according to claim 33, wherein, each of the first and second spatial modulation means comprises a plurality of controllable elements and for each controllable element of one of the first and second spatial modulation means, the other one of the first and second spatial modulation means has in the range of eight to one hundred forty four corresponding controllable elements.

41. A display according to claim 33, wherein the means for controlling the first and second spatial modulation means comprises a controller configured to provide a first control signal to control the controllable elements of the first spatial modulation means to provide an approximation of a desired image and to provide a second control signal to control the controllable elements of the second spatial modulation means to correct the approximate image.

42. A display according to claim 41, wherein the second control signal controls the controllable elements of the second spatial modulation means to modulate light incident on them by an amount based upon the desired luminance values divided by a known intensity of light incident from the first spatial modulation means on the controllable element of the second spatial modulation means.

* * * * *

UNITED STATES PATENT AND TRADEMARK OFFICE
CERTIFICATE OF CORRECTION

PATENT NO. : 7,106,505 B2 Page 1 of 1
APPLICATION NO. : 11/112428
DATED : September 12, 2006
INVENTOR(S) : Lorne Whitehead et al.

It is certified that error appears in the above-identified patent and that said Letters Patent is hereby corrected as shown below:

At col. 1, ln. 2, after the title, the following text is added:

-- The claimed invention was made as a result of activities undertaken within the scope of a joint research agreement as defined under 35 U.S.C. 103(c) between the National Sciences and Engineering Research Council of Canada, Lorne Whitehead of the University of British Columbia, Wolfgang Stuerzlinger and Hugh Wilson of York University, and Avi Chaudhuri of McGill University. --

Signed and Sealed this

Third Day of March, 2009

JOHN DOLL
*Acting Director of the United States Patent and Trademark Office*